(12) United States Patent
Yoshimura et al.

(10) Patent No.: US 12,179,156 B2
(45) Date of Patent: Dec. 31, 2024

(54) ZEOLITE MEMBRANE COMPLEX, METHOD OF PRODUCING ZEOLITE MEMBRANE COMPLEX, METHOD OF TREATING ZEOLITE MEMBRANE COMPLEX, AND SEPARATION METHOD

(71) Applicant: NGK INSULATORS, LTD., Nagoya (JP)

(72) Inventors: Ryotaro Yoshimura, Kasugai (JP); Kenichi Noda, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 334 days.

(21) Appl. No.: 17/444,755

(22) Filed: Aug. 10, 2021

(65) Prior Publication Data

US 2021/0370243 A1 Dec. 2, 2021

Related U.S. Application Data

(63) Continuation of application No. PCT/JP2020/002776, filed on Jan. 27, 2020.

(30) Foreign Application Priority Data

Mar. 26, 2019 (JP) .................................. 2019-058224

(51) Int. Cl.
*B01D 71/02* (2006.01)
*B01D 53/22* (2006.01)
*B01D 67/00* (2006.01)
*B01D 69/10* (2006.01)

(52) U.S. Cl.
CPC ....... *B01D 71/0281* (2022.08); *B01D 53/228* (2013.01); *B01D 67/0051* (2013.01); *B01D 69/108* (2022.08)

(58) Field of Classification Search
None
See application file for complete search history.

(56) References Cited

U.S. PATENT DOCUMENTS

2015/0224487 A1\* 8/2015 Miyahara ............. B01D 71/028
502/56

FOREIGN PATENT DOCUMENTS

| JP | 2009-011980 A | | 1/2009 | |
|---|---|---|---|---|
| JP | 2012-045484 A | | 3/2012 | |
| JP | 2013-013884 A | | 1/2013 | |
| JP | 2013-176765 A | | 9/2013 | |
| JP | 2015-147204 A | | 8/2015 | |
| JP | 2016-159185 | \* | 9/2016 | ............. B01D 71/02 |
| JP | 2016-159185 A | | 9/2016 | |

(Continued)

OTHER PUBLICATIONS

English translation of the International Preliminary Report on Patentability (Chapter I) dated Oct. 7, 2021 (Application No. PCT/JP2020/002776).

(Continued)

*Primary Examiner* — Jason M Greene
(74) *Attorney, Agent, or Firm* — BURR PATENT LAW, PLLC (57) ABSTRACT

A zeolite membrane complex includes a porous support and a zeolite membrane formed on the support. Water molecules are adsorbed in the zeolite membrane. A decreasing rate of water content in the zeolite membrane from 250° C. to 500° C. is 0.1% or more.

10 Claims, 3 Drawing Sheets

(56) References Cited

FOREIGN PATENT DOCUMENTS

| JP | 2018-164908 | * 10/2018 | ............. B01D 71/02 |
|----|-------------|-----------|--------------------------|
| JP | 2018-164908 A | 10/2018 | |
| JP | 2019-181456 A | 10/2019 | |

OTHER PUBLICATIONS

International Search Report and Written Opinion (PCT/JP2020/002776) dated Apr. 14, 2020.
Chinese Office Action dated Feb. 15, 2023 (Application No. 202080016557.8).

* cited by examiner

ZEOLITE MEMBRANE COMPLEX, METHOD OF PRODUCING ZEOLITE MEMBRANE COMPLEX, METHOD OF TREATING ZEOLITE MEMBRANE COMPLEX, AND SEPARATION METHOD

CROSS REFERENCE TO RELATED APPLICATION

The present application is a continuation application of International Application No. PCT/JP2020/002776 filed on Jan. 27, 2020, which claims the benefit of priority to Japanese Patent Application No. 2019-058224 filed on Mar. 26, 2019. The entire contents of these applications are incorporated herein by reference.

TECHNICAL FIELD

The present invention relates to a zeolite membrane complex, a method of producing a zeolite membrane complex, a method of treating a zeolite membrane complex, and a separation method for a mixed substance using a zeolite membrane complex.

BACKGROUND ART

Currently, various kinds of researches and developments are carried out on applications such as separation of specific molecules, adsorption of molecules, and the like using a molecular sieving function of zeolite in the form of a zeolite membrane complex obtained by forming a zeolite membrane on a porous support. For example, in the separation of a mixed gas containing a plurality of types of gases, the mixed gas is supplied to the zeolite membrane complex, and the high permeability gas permeates through the zeolite membrane complex to be separated from other gases.

Japanese Patent Application Laid-Open No. 2013-176765 (Document 1) proposes a technique where, in a gas dehumidifier that removes water vapor from a gas containing the water vapor, a zeolite membrane is set after a water washing step for air in order to improve separation performance between water vapor and air by the zeolite membrane. In this case, the saturated water vapor contained in the air that has undergone the water washing step is adsorbed in the pores of the zeolite crystals and the gaps between the zeolite crystals, and the air is prevented from permeating through the pores and gaps. This improves the separation performance between water vapor and air.

Japanese Patent Application Laid-Open No. 2016-159185 (Document 2) proposes a technique where a porous support provided with a zeolite membrane is pressure-treated in a solvent in an environment of room temperature and 0.5 MPa or more, in order to improve a permeance ratio of the zeolite membrane.

In the gas dehumidifier of Document 1, the separation performance between water vapor and air is improved, but the separation performance of other gases cannot be improved. In the treatment method of Document 2, the adhesion of the solvent or the like to the zeolite membrane is not sufficient, and the effect of improving the permeance ratio is small. In the treated zeolite membrane, the effect of improving the permeance ratio when separating the mixed gas at a high temperature is particularly small.

SUMMARY OF INVENTION

The present invention is intended for a zeolite membrane complex, and it is an object of the present invention to improve a permeance ratio of the zeolite membrane complex.

The zeolite membrane complex according to a preferable embodiment of the present invention includes a porous support and a zeolite membrane formed on the support. Water molecules are adsorbed in the zeolite membrane. A decreasing rate of water content in the zeolite membrane from 250° C. to 500° C. is 0.1% or more. This makes it possible to improve a permeance ratio.

Preferably, the decreasing rate of water content in the zeolite membrane from 250° C. to 500° C. is 0.2% or more.

Preferably, a maximum number of membered rings in zeolite crystals contained in the zeolite membrane is 8.

Preferably, a molar ratio of Si elements to Al elements contained in the zeolite membrane is 3 or more.

Preferably, a framework structure of zeolite crystals contained in the zeolite membrane includes at least one composite building unit composed of only 6 or less-membered ring structures.

The present invention is also intended for a method of producing a zeolite membrane complex. The method of producing a zeolite membrane complex according to a preferable embodiment of the present invention includes a) immersing a porous support in a starting material solution to form a zeolite membrane on the support by hydrothermal synthesis, and b) causing the zeolite membrane to adsorb water molecules in an environment of 40° C. or more and 5 MPa or more.

Preferably, the method of producing a zeolite membrane complex further includes, between the operations a) and b), heating the zeolite membrane to remove a structure-directing agent.

The present invention is also intended for a method of treating a zeolite membrane complex. The method of treating a zeolite membrane complex according to a preferable embodiment of the present invention includes a) heating a zeolite membrane formed on a support by hydrothermal synthesis to remove a structure-directing agent, and b) causing the zeolite membrane to adsorb water molecules in an environment of 40° C. or more and 5 MPa or more.

The present invention is also intended for a separation method. The separation method according to a preferable embodiment of the present invention includes a) preparing the aforementioned zeolite membrane complex; and b) supplying a mixed substance containing a plurality of types of gases or liquids to the zeolite membrane complex and allowing a high permeability substance in the mixed substance to permeate through the zeolite membrane complex, to separate the high permeability substance from other substances.

Preferably, the mixed substance contains at least one of following substances: hydrogen, helium, nitrogen, oxygen, water, water vapor, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

These and other objects, features, aspects and advantages of the present invention will become more apparent from the following detailed description of the present invention when taken in conjunction with the accompanying drawings.

DESCRIPTION OF EMBODIMENTS

Figure 1:
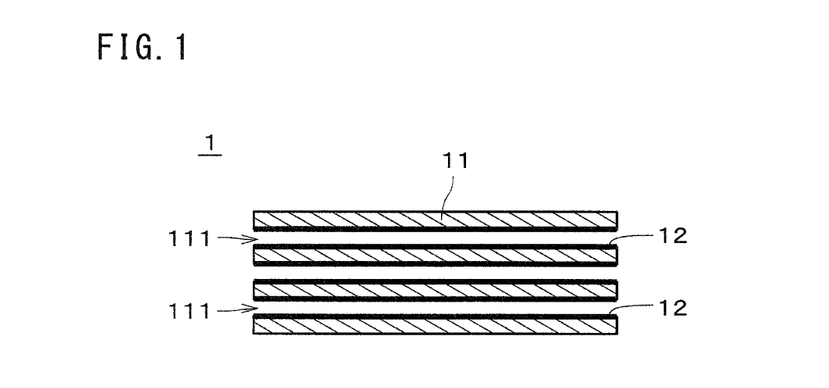
FIG. 1 is a sectional view of a zeolite membrane complex according to an embodiment.
Figure 2:
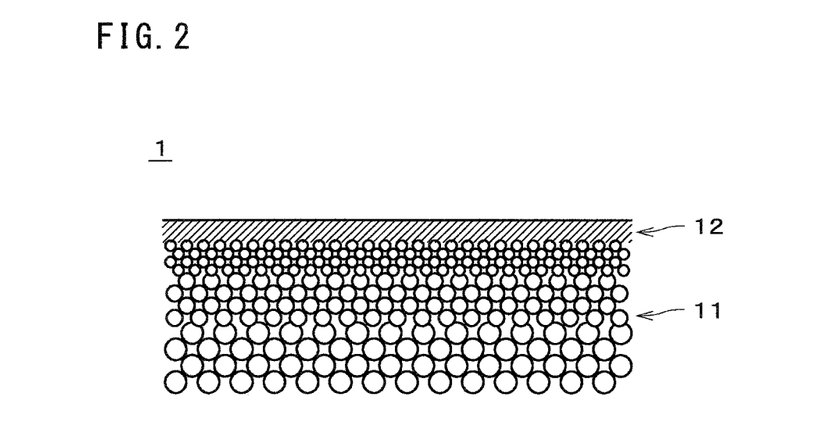
FIG. 2 is a sectional view illustrating part of the zeolite membrane complex in enlarged dimension.

FIG. 1 is a sectional view of a zeolite membrane complex 1. FIG. 2 is a sectional view illustrating part of the zeolite membrane complex 1 in enlarged dimension. The zeolite membrane complex 1 includes a porous support 11 and a zeolite membrane 12 formed on the support 11. The zeolite membrane 12 refers to at least a zeolite formed into a membrane on a surface of the support 11, and does not include zeolite particles that are merely dispersed in an organic membrane. The zeolite membrane 12 may include two or more types of zeolites having different structures and compositions. In FIG. 1, the zeolite membrane 12 is illustrated with bold lines. In FIG. 2, the zeolite membrane 12 is indicated by hatching. In FIG. 2, the thickness of the zeolite membrane 12 is illustrated thicker than the actual thickness.

The support 11 is a porous member permeable to gases and liquids. In the example illustrated in FIG. 1, the support 11 is a monolith support obtained by forming a plurality of through holes 111, each extending in a longitudinal direction (i.e., a left-right direction in FIG. 1), in an integral columnar body that is molded integrally. In the example illustrated in FIG. 1, the support 11 has a substantially circular columnar shape. Each through hole 111 (i.e., cell) has, for example, a substantially circular section perpendicular to the longitudinal direction. In FIG. 1, the through holes 111 are illustrated as having a greater diameter than the actual diameter, and a smaller number of through holes 111 than the actual number. The zeolite membrane 12 is formed on the inner surfaces of the through holes 111 and cover substantially the entire inner surfaces of the through holes 111.

The support 11 has a length (i.e., length in the right-left direction in FIG. 1) of, for example, 10 cm to 200 cm. The support 11 has an outer diameter of, for example, 0.5 cm to 30 cm. The distance between the central axes of each pair of adjacent through holes 111 is in the range of, for example, 0.3 mm to 10 mm. The surface roughness (Ra) of the support 11 is in the range of, for example, 0.1 μm to 5.0 μm and preferably in the range of 0.2 μm to 2.0 μm. Alternatively, the support 11 may have a different shape such as a honeycomb shape, a flat plate shape, a tubular shape, a circular cylindrical shape, a circular columnar shape, or a polygonal prism shape. When having a tubular shape or a circular cylindrical shape, the support 11 has a thickness of, for example, 0.1 mm to 10 mm.

Various substances (e.g., a ceramic or a metal) may be employed as the material for the support 11 as long as they have chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttria, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass fit, clay minerals, and easily sinterable cordierite.

The support 11 has a mean pore diameter of, for example, 0.01 μm to 70 μm and preferably 0.05 μm to 25 μm. A portion of the support 11 that is located in the vicinity of the surface where the zeolite membrane 12 is formed has a mean pore diameter of 0.01 μm to 1 μm, and preferably 0.05 μm to 0.5 μm. The mean pore diameters can be measured with, for example, a mercury porosimeter, a perm porosimeter, or a nano-perm porosimeter. As to a pore size distribution of the support 11 as a whole including the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The portion of the support 11 that is located in the vicinity of the surface where the zeolite membrane 12 is formed has a porosity of, for example, 20% to 60%.

The support 11 has, for example, a multilayer structure in which a plurality of layers having different mean pore diameters are laminated one above another in the thickness direction. The mean pore diameter and sintered particle diameter of a surface layer that includes the surface where the zeolite membrane 12 is formed are smaller than mean pore diameters and sintered particle diameters of other layers different from the surface layer. The surface layer of the support 11 has a mean pore diameter of, for example, 0.01 μm to 1 μm, and preferably 0.05 μm to 0.5 μm. When the support 11 has a multilayer structure, the material for each layer may be any of the materials described above. The materials for the plurality of layers, which form the multilayer structure, may be the same material, or may be different materials.

The zeolite membrane 12 is a porous membrane having pores. The zeolite membrane 12 can be used as a separation membrane that uses a molecular sieving function to separate a specific substance from a mixed substance containing a plurality of types of substances. The zeolite membrane 12 is less permeable to other substances than to the specific substance. In other words, the amount by which the other substances permeate through the zeolite membrane 12 is smaller than the amount by which the aforementioned specific substance permeates through the zeolite membrane 12.

The zeolite membrane 12 has a thickness of, for example, 0.05 μm to 30 μm, preferably 0.1 μm to 20 μm, and more preferably 0.5 μm to 10 μm. Separation performance improves as the thickness of the zeolite membrane 12 increases. The permeance increases as the thickness of the zeolite membrane 12 decreases. The surface roughness (Ra) of the zeolite membrane 12 is, for example, 5 μm or less, preferably 2 μm or less, more preferably 1 μm or less, and yet more preferably 0.5 μm or less.

The zeolite membrane 12 has a pore diameter of, for example, greater than or equal to 0.2 nm and less than 0.4 nm, and preferably greater than or equal to 0.3 nm and less than 0.4 nm. When the zeolite membrane 12 has a pore diameter of less than 0.2 nm, the permeance of gas through the zeolite membrane may decrease, and when the zeolite membrane 12 has a pore diameter of greater than or equal to 0.4 nm, the zeolite membrane may have insufficient selectivity. The pore diameter of the zeolite membrane 12 refers to a diameter (i.e., minor axis) of a pore in a direction substantially perpendicular to a maximum diameter (i.e., a maximum value of the distance between oxygen atoms) of the pore in the zeolite constituting the zeolite membrane 12. When n is defined as a maximum number of membered rings in the zeolite constituting the zeolite membrane 12, the minor axis of an n-membered ring pore is defined as the pore diameter of the zeolite membrane 12. When the zeolite has a plurality of types of n-membered ring pores where n is the same number, the minor axis of an n-membered ring pore that has a largest minor axis is defined as the pore diameter of the zeolite membrane 12. The pore diameter of the zeolite membrane 12 is smaller than the mean pore diameter of the surface of the support 11 where the zeolite membrane 12 is formed.

Note that an n-membered ring refers to a ring in which n oxygen atoms constitute a framework of a pore and each oxygen atom and a T atom described later are bonded together to form a ring structure. An n-membered ring also refers to a ring that forms a through hole (channel), and does not include a ring that fails to form a through hole. An n-membered ring pore refers to a pore formed by an n-membered ring.

The pore diameter of the zeolite membrane is uniquely determined by the framework structure of the zeolite and obtained from a value presented in the "Database of Zeolite Structures," [online] by the International Zeolite Association on the Internet (URL:http://www.iza-structure.org/databases/).

The zeolite membrane 12 is composed of, for example, a DDR-type zeolite. In other words, the zeolite membrane 12 is a zeolite membrane composed of a zeolite having a framework type code "DDR" assigned by the International Zeolite Association. In this case, the zeolite constituting the zeolite membrane 12 has an intrinsic pore diameter of 0.36 nm×0.44 nm.

The type of the zeolite, which constitutes the zeolite membrane 12, is not particularly limited, and the zeolite may, for example, be any of the followings: AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, and SOD-type. More preferably, the zeolite may, for example, be any of the followings: AEI-type, AFN-type, AFV-type, AFX-type, CHA-type, DDR-type, ERI-type, ETL-type, GIS-type, LEV-type, LTA-type, PAU-type, RHO-type, and SAT-type. Yet more preferably, the zeolite may, for example, be any of the followings: AEI-type, AFN-type, AFV-type, AFX-type, CHA-type, DDR-type, ERI-type, ETL-type, GIS-type, LEV-type, PAU-type, RHO-type, and SAT-type.

The zeolite constituting the zeolite membrane 12 contains, for example, aluminum (Al) as T atoms. The zeolite constituting the zeolite membrane 12 may, for example, be a zeolite in which atoms (T atoms) each located in the center of an oxygen tetrahedron ($TO_4$) of zeolite are composed of only silicon (Si) or Si and Al; an AlPO-type zeolite in which T atoms are composed of Al and phosphorus (P); an SAPO-type zeolite in which T atoms are composed of Si, Al, and P; an MAPSO-type zeolite in which T atoms are composed of magnesium (Mg), Si, Al, and P; or a ZnAPSO-type zeolite in which T atoms are composed of zinc (Zn), Si, Al, and P. Some of the T atoms may be replaced by other elements.

The zeolite membrane 12 contains, for example, Si. For example, the zeolite membrane 12 may contain any two or more of Si, Al, and P. The zeolite membrane 12 may contain alkali metal. The alkali metal is, for example, sodium (Na) or potassium (K).

When the zeolite membrane 12 contains Si atoms and Al atoms, the Si/Al ratio in the zeolite membrane 12 is, for example, one or more and a hundred thousand or less. The Si/Al ratio is a molar ratio of Si elements to Al elements contained in the zeolite membrane 12. The Si/Al ratio is preferably 3 or more, more preferably 20 or more, and yet more preferably 100 or more, and is preferably as high as possible. The Si/Al ratio in the zeolite membrane 12 may be adjusted by, for example, adjusting the composition ratio of Si source and Al source in a starting material solution described later.

From the viewpoints of increasing the permeance of $CO_2$ and improving separation performance, a maximum number of membered rings in the zeolite contained in the zeolite membrane 12 is preferably 8 or less (e.g., 6 or 8). The framework structure of zeolite crystals contained in the zeolite membrane 12 preferably includes at least one composite building unit (CBU) composed of only 6 or less-membered ring structures. The composite building unit refers to one unit structure of the framework structure of zeolite. Details of the composite building unit are presented in the "Database of Zeolite Structures," [online] by the International Zeolite Association (IZA) on the Internet (URL:http://www.iza-structure.org/databases/) (search date Nov. 21, 2014).

In the zeolite membrane complex 1, water molecules are adsorbed in the zeolite membrane 12. For example, the water molecules are adsorbed inside the aforementioned composite building unit. When the amount of water molecules adsorbed in the zeolite membrane 12 (i.e., the water content in the zeolite membrane 12) is measured by TG-DTA (thermogravimetric-differential thermal) analysis, the decreasing rate of water content in the zeolite membrane 12 from 250° C. to 500° C. is 0.1% or more. The decreasing rate of water content in the zeolite membrane 12 from 250° C. to 500° C. is preferably 0.2% or more. For confirmation that the adsorbed substance is water, for example, temperature programmed desorption/mass spectrometry (TPD-MS) can be used.

The decreasing rate of water content is a value obtained by dividing the weight of the water discharged from the zeolite membrane 12 during the temperature increase of the zeolite membrane 12 from 250° C. to 500° C. by the weight of the zeolite membrane 12 after the temperature increase. That is, the decreasing rate of water content is calculated by "(weight of zeolite membrane 12 at 250° C.–weight of zeolite membrane 12 at 500° C.)/weight of zeolite membrane 12 at 500° C.". The larger the decreasing rate of water content is, the larger the amount of water strongly adsorbed in the zeolite membrane 12 is.

The permeance of $CO_2$ through the zeolite membrane 12 at a temperature of 20° C. to 400° C. is, for example, 100 nmol/$m^2$·s·Pa or more. The ratio (permeance ratio) of the permeance of $CO_2$ through the zeolite membrane 12 to the permeance (leakage) of $CH_4$ at a temperature of 20° C. to 400° C. is, for example, 100 or more. The permeance and the permeance ratio are values for the case where the partial pressure difference of $CO_2$ between the supply and permeation sides of the zeolite membrane 12 is 1.5 MPa.

Figure 3:
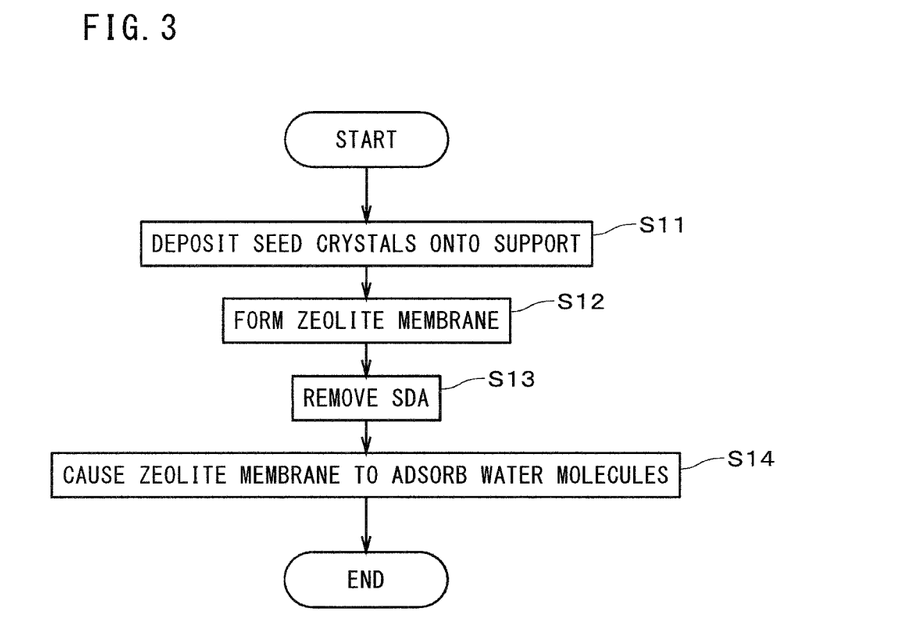
FIG. 3 is a flowchart of production of the zeolite membrane complex.

Next, an example of the procedure for producing the zeolite membrane complex 1 will be described with reference to FIG. 3. In the production of the zeolite membrane complex 1, first, seed crystals for use in the production of the zeolite membrane 12 are prepared. The seed crystals are, for example, acquired from DDR-type zeolite powder generated by hydrothermal synthesis. This zeolite powder may be used as-is as seed crystals, or may be processed into seed crystals by, for example, pulverization.

Then, the porous support 11 is immersed in a solution in which the seed crystals are dispersed, so that the seed crystals are deposited on the support 11 (step S11). Alternatively, a solution in which the seed crystals are dispersed may be brought into contact with a portion of the support 11 on which the zeolite membrane 12 is desired to be formed, so that the seed crystals are deposited on the support 11. In this way, a seed-crystal-deposited support is prepared. The seed crystals may be deposited by other methods on the support 11.

The support 11 with the seed crystals deposited thereon is immersed in a starting material solution. The starting material solution is prepared by, for example, dissolving or dispersing substances such as Si source and a structure-directing agent (hereinafter, also referred to as an "SDA") in a solvent. The solvent in the starting material solution may, for example, be water or alcohol such as ethanol. The SDA contained in the starting material solution may, for example, be an organic substance. As the SDA, for example, 1-adamantanamine may be used.

Then, DDR-type zeolite is grown by hydrothermal synthesis using the seed crystals as nuclei, to form a DDR-type zeolite membrane 12 on the support 11 (step S12). The temperature of the hydrothermal synthesis is preferably in the range of 120 to 200° C. and, for example, 125° C. The hydrothermal synthesis time is preferably in the range of 10 to 100 hours and, for example, 30 hours.

After the hydrothermal synthesis is completed, the support 11 and the zeolite membrane 12 are rinsed with pure water. After the rinsing, the support 11 and the zeolite membrane 12 are dried at, for example, 80° C. After the support 11 and the zeolite membrane 12 are dried, the zeolite membrane 12 is subjected to heat treatment in an electric furnace or the like so as to almost completely burn and remove the SDA in the zeolite membrane 12 and to cause micropores in the zeolite membrane 12 to come through the membrane (step S13). In step S13, the SDA in the zeolite membrane 12 may be completely removed or some of the SDA may remain. The heating temperature in step S13 is, for example, in the range of 300° C. to 1000° C. In step S13, unnecessary water adhering to the pores of the zeolite membrane 12 is also removed.

After step S13 is completed, water is supplied to the zeolite membrane 12 and water molecules are adsorbed into the zeolite membrane 12 (step S14). The water molecules are adsorbed in an environment of 40° C. or more and 5 MPa or more. The adsorption of water molecules into the zeolite membrane 12 may be performed by various methods. For example, the adsorption of water molecules into the zeolite membrane 12 may be performed by an adsorption apparatus 3 shown in FIG. 4.

Figure 4:
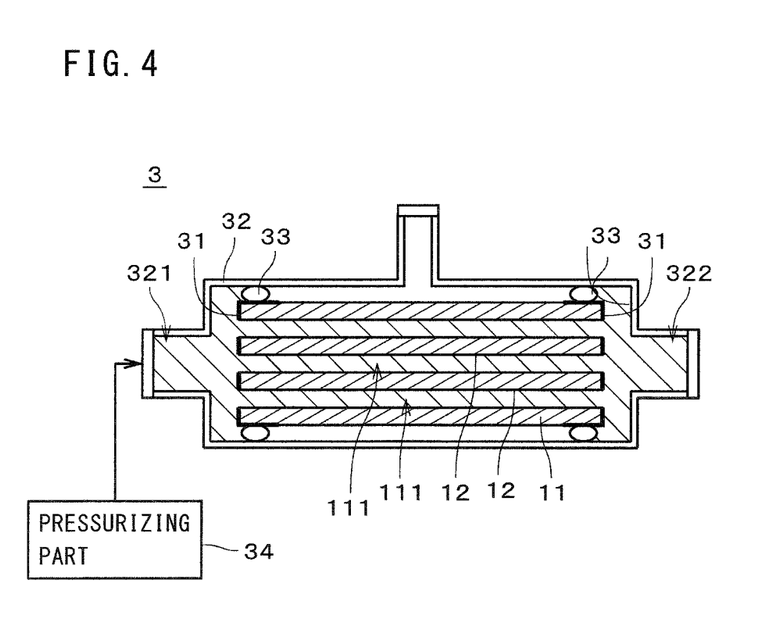
FIG. 4 is a diagram illustrating an adsorption apparatus.

The adsorption apparatus 3 includes a sealing part 31, a housing 32, two seal members 33, and a pressurizing part 34. The support 11 provided with the zeolite membrane 12 in which the aforementioned SDA has been removed are placed together with the sealing part 31 and the seal members 33 in the housing 32. The pressurizing part 34 is disposed outside the housing 32 and connected to the housing 32. The pressurizing part 34 is, for example, a booster pump.

The sealing part 31 is members mounted on both ends of the support 11 in the longitudinal direction (i.e., left-right direction in FIG. 4) and for covering and sealing both end faces of the support 11 in the longitudinal direction and portions of the outer peripheral face in the vicinity of the end faces. The sealing part 31 prevents the inflow and outflow of liquid water through the end faces of the support 11. The sealing part 31 is, for example, plate-like members formed of glass or a resin. The material and shape of the sealing part 31 may be appropriately changed. Since the sealing part 31 has a plurality of openings that overlap the through holes 111 of the support 11, both ends of each through hole 111 of the support 11 in the longitudinal direction are not covered by the sealing part 31. This allows the inflow and outflow of water into/from the through holes 111 through both the ends.

Although there is no particular limitation on the shape of the housing 32, the housing 32 is, for example, a tubular member having a substantially circular cylindrical shape. The housing 32 is formed of, for example, stainless steel or carbon steel. The longitudinal direction of the housing 32 is substantially parallel to the longitudinal direction of the support 11. One end of the housing 32 in the longitudinal direction (i.e., left-side end in FIG. 4) has a supply port 321, and the other end thereof has a discharge port 322. The supply port 321 can be connected to a water supply source (not shown) for supplying liquid water and the pressurizing part 34. The discharge port 322 can be opened and closed.

The two seal members 33 are disposed around the entire circumference between the outer peripheral face of the support 11 and the inner peripheral face of the housing 32 in the vicinity of both the ends of the support 11 in the longitudinal direction. Each seal member 33 is a substantially circular ring-shaped member formed of a material impermeable to water. For example, the seal members 33 are O-rings formed of a resin having flexibility. The seal members 33 are in tight contact with the outer peripheral face of the support 11 and the inner peripheral face of the housing 32 around the entire circumference. In the example illustrated in FIG. 4, the seal members 33 are in tight contact with the outer peripheral face of the sealing part 31 and are indirectly in tight contact with the outer peripheral face of the support 11 via the sealing part 31. The part between the seal member 33 and the outer peripheral face of the support 11 and the part between the seal member 33 and the inner peripheral face of the housing 32 are sealed so as to almost or completely disable the passage of water.

In the adsorption of water into the zeolite membrane 12, first, liquid water is supplied from the aforementioned water supply source to the internal space of the housing 32 via the supply port 321. The temperature of the water is preferably 40° C. or more. The water supplied from the supply port 321 to the housing 32 is introduced into each through hole 111 of the support 11 from the left end of the support 11 in the drawing. In the adsorption apparatus 3, the discharge port 322 is closed, and the water supplied from the supply port 321 is filled in each through hole 111 and in contact with the entire surface of the zeolite membrane 12 formed on the inner surface of the through hole 111. In FIG. 4, the water in the housing 32 is indicated by hatching.

After each through hole 111 is filled with water, the water in the housing 32 is pressurized by the pressurizing part 34. When the pressurization of water by the pressurizing part 34 is started, the temperature of the water in each through hole 111 is set to 40° C. or more. In the adsorption apparatus 3, the water in the housing 32 may be heated before the start of pressurization by the pressurizing part 34, if necessary. The pressure applied to the water in the through hole 111 by the pressurizing part 34 is 5 MPa or more. In the adsorption apparatus 3, the pressurization by the pressurizing part 34 is maintained for a predetermined time (e.g., 1 minute to 60 minutes). With this, water molecules are adsorbed in the zeolite membrane 12 in each through hole 111.

After the pressurization by the pressurizing part 34 is completed, the discharge port 322 is opened and the water in each through hole 111 is discharged from the discharge port 322. After that, the support 11 is taken out from the adsorption apparatus 3, and the support 11 and the zeolite membrane 12 are dried at a predetermined drying temperature. The drying temperature is less than 250° C., for example, in the range of 80° C. to 200° C. As a result, unnecessary water adhering to the pores of the zeolite membrane 12 is removed, and the aforementioned zeolite membrane complex 1 (i.e., the zeolite membrane complex 1 in which water molecules are adsorbed in the zeolite membrane 12) is obtained.

Figure 5:
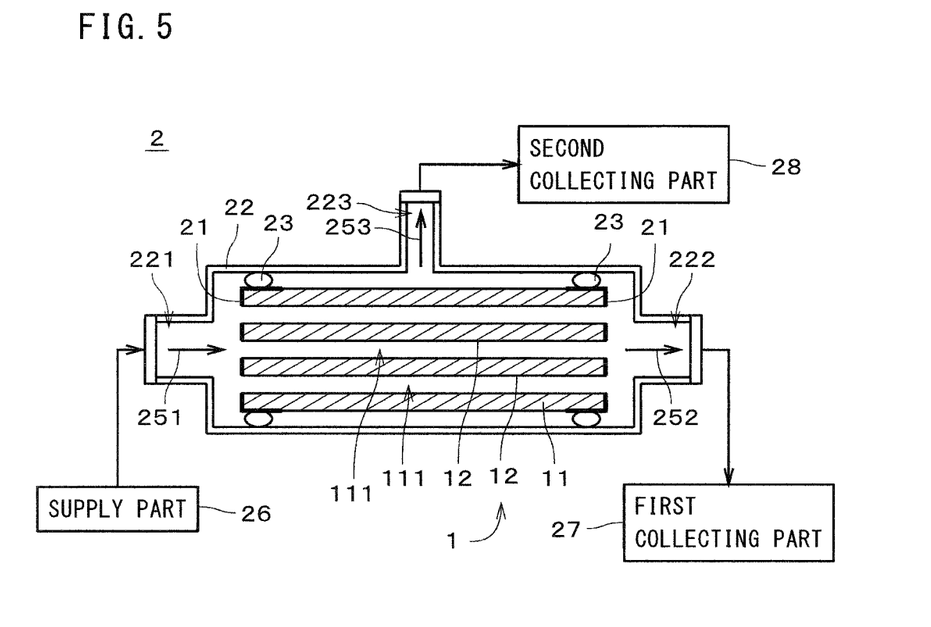
FIG. 5 is a diagram illustrating an apparatus for separating a mixed substance.
Figure 6:
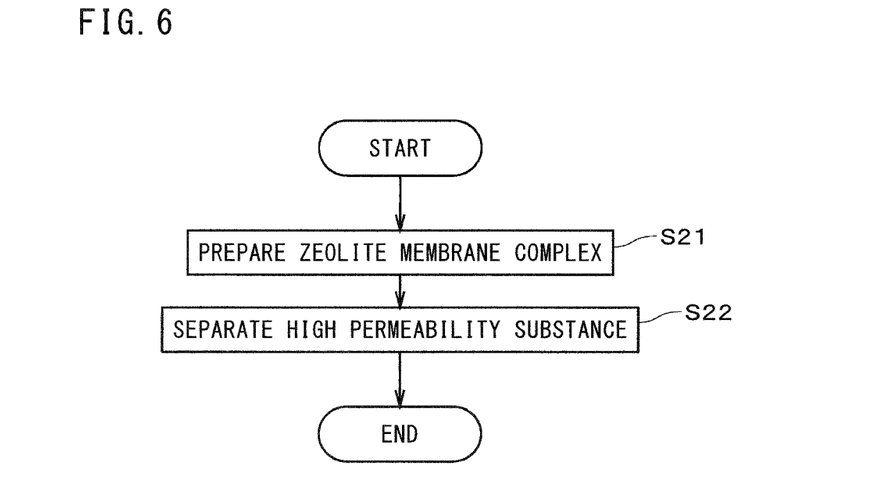
FIG. 6 is a flowchart of separation of the mixed substance.

Next, separation of a mixed substance using the zeolite membrane complex 1 will be described with reference to FIGS. 5 and 6. FIG. 5 is a diagram illustrating a separation apparatus 2. FIG. 6 is a flowchart of the separation of the mixed substance performed by the separation apparatus 2.

The separation apparatus 2 supplies a mixed substance containing a plurality of types of fluids (i.e., gases or liquids) to the zeolite membrane complex 1 and allowing a substance with high permeability in the mixed substance to permeate through the zeolite membrane complex 1 so as to separate that substance from the mixed substance. Separation in the separation apparatus 2 may be performed, for example, in order to extract a substance with high permeability from a mixed substance, or in order to concentrate a substance with low permeability.

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_X$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with one or more and eight or less carbon atoms. The C3 to C8 hydrocarbons may be any one of a linear-chain compound, a side-chain compound, and a ring compound. Further, the C2 to C8 hydrocarbons may either be a saturated hydrocarbon (i.e., in which there is no double bond and triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether (($CH_3)_2O$), methyl ethyl ether ($C_2H_5OCH_3$), diethyl ether (($C_2H_5)_2O$), or the like.

The above-described ketone is, for example, acetone (($CH_3)_2CO$), methyl ethyl ketone ($C_2H_5COCH_3$), diethyl ketone (($C_2H_5)_2CO$), or the like.

The above-described aldehyde is, for example, acetaldehyde ($CH_3CHO$), propionaldehyde ($C_2H_5CHO$), butanal (butyraldehyde) ($C_3H_7CHO$), or the like.

In the following description, it is assumed that the mixed substance separated by the separation apparatus 2 is a mixed gas containing a plurality of types of gases.

The separation apparatus 2 includes the zeolite membrane complex 1, a sealing part 21, a housing 22, two seal members 23, a supply part 26, a first collecting part 27, and a second collecting part 28. The zeolite membrane complex 1, the sealing part 21, and the seal members 23 are placed in the housing 22. The supply part 26, the first collecting part 27, and the second collecting part 28 are disposed outside the housing 22 and connected to the housing 22.

The sealing part 21 is members mounted on both ends of the support 11 in the longitudinal direction (i.e., left-right direction in FIG. 5) and for covering and sealing both end faces of the support 11 in the longitudinal direction and portions of the outer peripheral face in the vicinity of the end faces. The sealing part 21 prevents the inflow and outflow of gases through the end faces of the support 11. The sealing part 21 is, for example, plate-like members formed of glass or a resin. The material and shape of the sealing part 21 may be appropriately changed. Since the sealing part 21 has a plurality of openings that overlap the through holes 111 of the support 11, both ends of each through hole 111 of the support 11 in the longitudinal direction are not covered by the sealing part 21. This allows the inflow and outflow of gases or the like into/from the through holes 111 through both the ends.

Although there is no particular limitation on the shape of the housing 22, the housing 22 is, for example, a tubular member having a substantially circular cylindrical shape. The housing 22 is formed of, for example, stainless steel or carbon steel. The longitudinal direction of the housing 22 is substantially parallel to the longitudinal direction of the zeolite membrane complex 1. One end of the housing 22 in the longitudinal direction (i.e., left-side end in FIG. 5) has a supply port 221, and the other end thereof has a first exhaust port 222. A peripheral face of the housing 22 has a second exhaust port 223. The supply port 221 is connected to the supply part 26. The first exhaust port 222 is connected to the first collecting part 27. The second exhaust port 223 is connected to the second collecting part 28. The internal space of the housing 22 is a sealed space isolated from the space around the housing 22.

The two seal members 23 are disposed around the entire circumference between the outer peripheral face of the zeolite membrane complex 1 and the inner peripheral face of the housing 22 in the vicinity of both ends of the zeolite membrane complex 1 in the longitudinal direction. Each seal member 23 is a substantially circular ring-shaped member formed of a material impermeable to gases. For example, the seal members 23 are O-rings formed of a resin having flexibility. The seal members 23 are in tight contact with the outer peripheral face of the zeolite membrane complex 1 and the inner peripheral face of the housing 22 around the entire circumference. In the example illustrated in FIG. 5, the seal members 23 are in tight contact with the outer peripheral face of the sealing part 21 and are indirectly in tight contact with the outer peripheral face of the zeolite membrane complex 1 via the sealing part 21. The part between the seal member 23 and the outer peripheral face of the zeolite membrane complex 1 and the part between the seal member 23 and the inner peripheral face of the housing 22 are sealed so as to almost or completely disable the passage of gases.

The supply part 26 supplies a mixed gas to the internal space of the housing 22 through the supply port 221. For example, the supply part 26 is a blower or pump that feeds the mixed gas toward the housing 22 by pressure-feeding. The blower or pump includes a pressure regulator that regulates the pressure of the mixed gas supplied to the housing 22. The first collecting part 27 and the second collecting part 28 are, for example, reservoirs that store gases derived from the housing 22, or blowers or pumps that feed gases.

In the separation of a mixed gas, the aforementioned separation apparatus 2 is provided to prepare the zeolite membrane complex 1 (FIG. 6: step S21). Then, a mixed gas containing a plurality of types of gases having different permeability to the zeolite membrane 12 is supplied from the supply part 26 to the internal space of the housing 22. For example, the main component of the mixed gas is $CO_2$ and $CH_4$. The mixed gas may contain any gas other than $CO_2$ and $CH_4$. The pressure (i.e., introduction pressure) of the mixed gas supplied from the supply part 26 into the internal space of the housing 22 is in the range of, for example, 0.1 MPa to 20.0 MPa. The temperature for separation of the mixed gas is in the range of, for example, 10° C. to 200° C.

The mixed gas supplied from the supply part 26 into the housing 22 is introduced from the left end of the zeolite membrane complex 1 in the drawing into each through hole 111 of the support 11 as indicated by an arrow 251. A gas having high permeability (e.g., $CO_2$; hereinafter referred to as a "high permeability substance") in the mixed gas permeates through the zeolite membrane 12 provided on the inner surface of each through hole 111 and the support 11, and is led out from the outer peripheral face of the support 11. In this way, the high permeability substance is separated from a gas having low permeability (e.g., $CH_4$; hereinafter referred to as a "low permeability substance") in the mixed gas (step S22). A gas (hereinafter referred to as a "permeate substance") led out from the outer peripheral face of the support 11 is collected by the second collecting part 28 through the second exhaust port 223 as indicated by an arrow 253. The pressure (i.e., permeation pressure) of the gas collected by the second collecting part 28 through the second exhaust port 223 is, for example, approximately one atmospheric pressure (0.101 MPa).

In the mixed gas, a gas (hereinafter, referred to as "non-permeate substance") other than the gas that has permeated through the zeolite membrane 12 and the support 11 passes through each through hole 111 of the support 11 from the left side to the right side in the drawing and is collected by the first collecting part 27 through the first exhaust port 222 as indicated by an arrow 252. The pressure of the gas collected by the first collecting part 27 through the first exhaust port 222 is, for example, substantially the same pressure as the introduction pressure. In addition to the aforementioned low permeability substance, the non-permeate substance may also include the high permeability substance that has not permeated through the zeolite membrane 12.

Next description is given of a relationship between the amount of water molecules adsorbed in the zeolite membrane 12 and the separation performance of the zeolite membrane complex 1. In the aforementioned separation apparatus 2, the separation performance is determined by a permeate substance (i.e., permeate gas) that has permeated through the zeolite membrane complex 1 and has been collected by the second collecting part 28 after the supply of the mixed gas of $CO_2$ and $CH_4$ from the supply part 26 to the zeolite membrane complex 1 in the housing 22. Specifically, the separation performance is a value (i.e., permeance ratio between $CO_2$ and $CH_4$) obtained by dividing the permeation amount of $CO_2$ collected by the second collecting part 28 by the leakage amount of $CH_4$ collected by the second collecting part 28. The volume fractions of $CO_2$ and $CH_4$ in the mixed gas supplied from the supply part 26 are both set to 50%, and the partial pressures of $CO_2$ and $CH_4$ are both set to 0.3 MPa.

In Example 1, the zeolite membrane complex 1 was prepared as follows. First, the DDR-type zeolite powder obtained by hydrothermal synthesis was used as seed crystals, and the support 11 was brought into contact with a solution in which the seed crystals were mixed into pure water with a predetermined mixing ratio, to deposit the seed crystals to each through hole 111. The mixing ratio was in the range of, for example, 0.001 mass % to 0.36 mass %.

Next, a mixture in which 1-adamantanamine (manufactured by Sigma-Aldrich Co. LLC) as SDA was dissolved in ethylenediamine (manufactured by Wako Pure Chemical Industries, Ltd.) was mixed with a mixture in which 30 mass % colloidal silica (manufactured by Nissan Chemical Corporation: Snowtex S) as Si source was added to pure water (e.g., ion-exchanged water), to prepare a starting material solution for the zeolite membrane 12. The weights of 1-adamantanamine, ethylenediamine, colloidal silica and pure water at the time of preparing the starting material solution were 1.156 g, 7.35 g, 98 g, and 116.55 g, respectively.

After preparing the starting material solution, the support 11 on which the seed crystals were deposited was immersed in the starting material solution and hydrothermally synthesized at 125° C. for 30 hours, to form a DDR-type zeolite membrane 12 on the support 11. Then, the support 11 on which the zeolite membrane 12 was formed was thoroughly washed with pure water and completely dried at 100° C. Next, the support 11 on which the zeolite membrane 12 was formed was heated in the air at 450° C. for 50 hours so as to burn and remove the SDA, to cause pores in the zeolite membrane 12 to come through the membrane.

Then, water molecules were adsorbed into the zeolite membrane 12 in an environment of 40° C. and 5 MPa. The adsorption treatment of water molecules into the zeolite membrane 12 was performed for 30 minutes. After that, the support 11 and the zeolite membrane 12 were dried at 150° C., to obtain a zeolite membrane complex 1. In Example 1, the decreasing rate of water content in the zeolite membrane 12 from 250° C. to 500° C. was 0.26%.

The production of the zeolite membrane complex 1 in Comparative Example 1 was substantially the same as that in Example 1 except that the conditions in the adsorption treatment of water molecules in step S14 were different. In Comparative Example 1, the temperature in the adsorption treatment of water molecules was 20° C., and the decreasing rate of water content in the zeolite membrane 12 from 250° C. to 500° C. was 0.08%.

The production of the zeolite membrane complex 1 in Comparative Example 2 was substantially the same as that in each of Example 1 and Comparative Example 1 except that the adsorption treatment of water molecules in step S14 was omitted. In Comparative Example 2, the decreasing rate of water content in the zeolite membrane 12 from 250° C. to 500° C. was therefore less than that in Comparative Example 1.

In Example 1, when the mixed gas at room temperature (i.e., 20° C.) was supplied to the zeolite membrane complex 1, the permeance ratio between $CO_2$ and $CH_4$ increased by about 20% as compared with that in Comparative Example 2. Additionally, when the mixed gas at 200° C. was supplied to the zeolite membrane complex 1 of Example 1, it showed high separation performance substantially in the same manner as when the mixed gas at room temperature was supplied.

On the other hand, in Comparative Example 1, when the mixed gas at room temperature (i.e., 20° C.) was supplied to the zeolite membrane complex 1, the permeance ratio between $CO_2$ and $CH_4$ increased by only about 7% as compared with that in Comparative Example 2. Additionally, when the mixed gas at 200° C. was supplied to the zeolite membrane complex 1 of Comparative Example 1, the permeance ratio between $CO_2$ and $CH_4$ in the zeolite membrane composite 1 decreased to substantially the same degree as that in Comparative Example 2.

As described above, the zeolite membrane complex 1 includes the porous support 11 and the zeolite membrane 12 formed on the support 11. Water molecules are adsorbed in the zeolite membrane 12. The decreasing rate of water content in the zeolite membrane 12 from 250° C. to 500° C. is 0.1% or more. As above, since the zeolite membrane 12 contains a relatively large amount of adsorbed water molecules even at a relatively high temperature (e.g., in an environment of about 250° C.), the permeance ratio of the zeolite membrane 12 can be improved in the separation of the mixed substance at a high temperature. In the separation of the mixed substance not only at a high temperature but also in another temperature range (e.g., at room temperature), the permeance ratio of the zeolite membrane 12 can be improved.

As described above, the decreasing rate of water content in the zeolite membrane 12 from 250° C. to 500° C. is preferably 0.2% or more. This makes it possible to further improve the permeance ratio of the zeolite membrane 12 in the separation of the mixed substance.

As described above, the maximum number of membered rings in zeolite crystals contained in the zeolite membrane 12 is preferably 8. As a result, when the mixed substance is separated by the zeolite membrane complex 1, the selective permeation of the permeation target substance such as $CO_2$ having a relatively small molecular diameter is suitably realized, and the permeation target substance can be efficiently separated from the mixed substance.

As described above, a molar ratio of Si elements to Al elements contained in the zeolite membrane 12 is preferably 3 or more. This suppresses excessive adsorption of water molecules in the zeolite membrane 12. As a result, deterioration of the permeation performance of the zeolite membrane 12 can be suppressed.

As described above, the framework structure of zeolite crystals contained in the zeolite membrane 12 preferably includes at least one composite building unit composed of only 6 or less-membered ring structures. This further suppresses desorption of water molecules from the zeolite membrane 12 at a high temperature. As a result, it is possible to further improve the permeance ratio of the zeolite membrane 12 in the separation of the mixed substance at a high temperature.

The aforementioned method of producing the zeolite membrane complex 1 includes the step of immersing the porous support 11 in a starting material solution to form the zeolite membrane 12 on the support 11 by hydrothermal synthesis (step S12), and the step of causing the zeolite membrane 12 to adsorb water molecules in an environment of 40° C. or more and 5 MPa or more (step S14). As described above, this makes it possible to easily produce the zeolite membrane 12 whose permeance ratio in the separation of the mixed substance is improved as compared with both of the zeolite membrane in which water molecules are not adsorbed and the zeolite membrane in which water molecules are adsorbed at room temperature.

As described above, it is preferable that the method of producing the zeolite membrane complex 1 further includes the step of heating the zeolite membrane 12 to remove an SDA between the steps S12 and S14 (step S13). When the zeolite membrane 12 contains the SDA, the SDA in the pores of the zeolite membrane 12 which hinders the adsorption of water molecules is removed in step S13. Therefore, in step S14, a desired amount of water molecules can be suitably adsorbed in the zeolite membrane 12.

The aforementioned method of treating the zeolite membrane complex 1 includes the step of heating the zeolite membrane 12 formed on the support 11 by hydrothermal synthesis to remove an SDA (step S13), and the step of causing the zeolite membrane 12 to adsorb water molecules in an environment of 40° C. or more and 5 MPa or more (step S14). With this, a desired amount of water molecules can be suitably adsorbed in the zeolite membrane 12. As a result, it is possible to easily improve the permeance ratio of the zeolite membrane 12.

The aforementioned separation method includes the step of preparing the above zeolite membrane complex 1 (step S21), and the step of supplying a mixed substance containing a plurality of types of gases or liquids to the zeolite membrane complex 1 and allowing a high permeability substance in the mixed substance to permeate through the zeolite membrane complex 1, to separate the high permeability substance from other substances (step S22). As described above, since the zeolite membrane complex 1 has high separation performance, the mixed substance can be efficiently separated by the separation method.

The separation method is in particular suitable for use in separating a mixed substance containing at least one of the following substances: hydrogen, helium, nitrogen, oxygen, water, water vapor, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

In the zeolite membrane complex 1, the method of producing the zeolite membrane complex 1, and the separation method described above, various modifications can be made.

For example, the water molecules adsorbed in the zeolite membrane 12 may be adsorbed in a site other than the aforementioned composite building unit. The framework structure of zeolite crystals contained in the zeolite membrane 12 does not necessarily have to include the aforementioned composite building unit.

When causing the zeolite membrane 12 to adsorb water molecules, gaseous water molecules (water vapor) may be brought into contact with the zeolite membrane 12. In the adsorption of water molecules, the zeolite membrane 12 has only to come into contact with a liquid or gas containing at least water molecules. The liquid or gas may be composed of only water molecules, or may contain water molecules and molecules other than water.

The molar ratio of Si elements to Al elements contained in the zeolite membrane 12 may be less than 3.

The maximum number of membered rings in zeolite crystals contained in the zeolite membrane 12 may be more than 8.

When any SDA is not used in the production of the zeolite membrane complex 1, removal of SDA in step S13 is omitted.

The zeolite membrane complex 1 may further include a function layer or a protective layer laminated on the zeolite membrane 12, additionally to the support 11 and the zeolite membrane 12. Such a function layer or a protective layer may be an inorganic membrane such as a zeolite membrane, a silica membrane, a carbon membrane, or the like or an organic membrane such as a polyimide membrane, a silicone membrane, or the like. Further, a substance that is easy to adsorb $CO_2$ may be added to the function layer or the protective layer laminated on the zeolite membrane 12.

In the separation apparatus 2 and the separation method, any substance other than the substances exemplarily shown in the above description may be separated from the mixed substance.

The configurations of the preferred embodiments and variations described above may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The zeolite membrane complex according to the present invention can be used, for example, as a gas separation membrane. The zeolite membrane complex can also be used as a separation membrane for substances other than gases, an adsorbent membrane for various substances, or the like in various fields in which zeolite is used.

REFERENCE SIGNS LIST

1 Zeolite membrane complex
11 Support
12 Zeolite membrane
S11 to S14, S21 to S22 Step

The invention claimed is:

1. A zeolite membrane complex, comprising:
    a porous support; and
    a zeolite membrane formed on said support, wherein water molecules are adsorbed in said zeolite membrane, and
    a decreasing rate of water content in said zeolite membrane from 250° C. to 500° C. is 0.1% or more.

2. The zeolite membrane complex according to claim 1, wherein
    the decreasing rate of water content in said zeolite membrane from 250° C. to 500° C. is 0.2% or more.

3. The zeolite membrane complex according to claim 1, wherein
    a maximum number of membered rings in zeolite crystals contained in said zeolite membrane is 8.

4. The zeolite membrane complex according to claim 1, wherein
    a molar ratio of Si elements to Al elements contained in said zeolite membrane is 3 or more.

5. The zeolite membrane complex according to claim 1, wherein
    a framework structure of zeolite crystals contained in said zeolite membrane includes at least one composite building unit composed of only 6 or less-membered ring structures.

6. A method of producing a zeolite membrane complex, comprising:
    a) immersing a porous support in a starting material solution to form a zeolite membrane on said support by hydrothermal synthesis;
    b) causing said zeolite membrane to adsorb water molecules in an environment of 40° C. or more and 5 MPa or more; and
    c) after said operation b), drying said support and said zeolite membrane at a temperature of 80° C. or higher and 200° C. or lower.

7. The method of producing a zeolite membrane complex according to claim 6, further comprising
    between said operations a) and b), heating said zeolite membrane to remove a structure-directing agent.

8. A method of treating a zeolite membrane complex, comprising:
    a) heating a zeolite membrane formed on a support by hydrothermal synthesis to remove a structure-directing agent;
    b) causing said zeolite membrane to adsorb water molecules in an environment of 40° C. or more and 5 MPa or more; and
    c) after said operation b), drying said support and said zeolite membrane at a temperature of 80° C. or higher and 200° C. or lower.

9. A separation method comprising:
    a) preparing a zeolite membrane complex according to claim 1; and
    b) supplying a mixed substance containing a plurality of types of gases or liquids to said zeolite membrane complex and allowing a high permeability substance in said mixed substance to permeate through said zeolite membrane complex, to separate said high permeability substance from other substances.

10. The separation method according to claim 9, wherein said mixed substance contains at least one of following substances: hydrogen, helium, nitrogen, oxygen, water, water vapor, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

* * * * *